July 7, 1959 H. W. MOORE 2,893,250
ROTARY TO OSCILLATING DRIVE
Filed Jan. 7, 1955 3 Sheets-Sheet 1
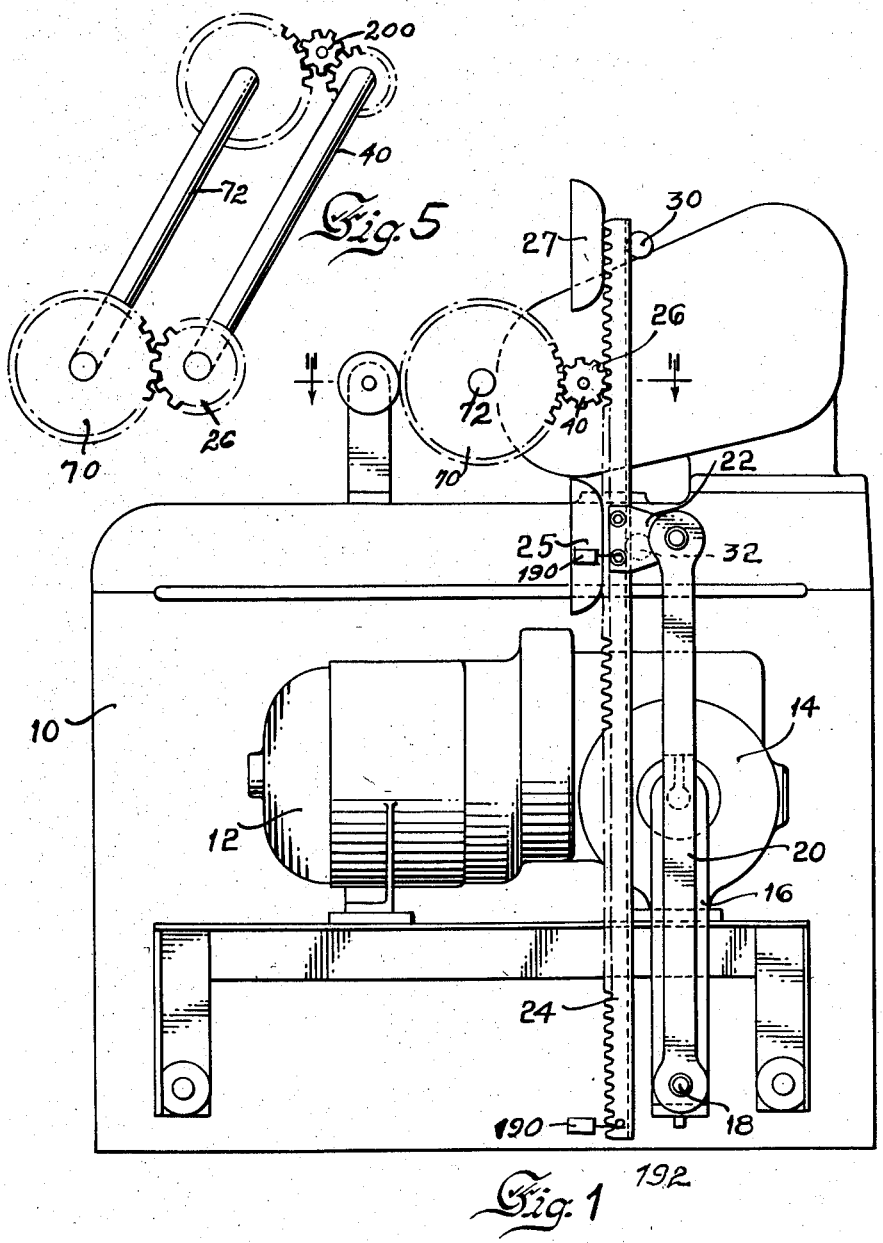
INVENTOR.
Harry W. Moore
BY
HIS ATTORNEYS

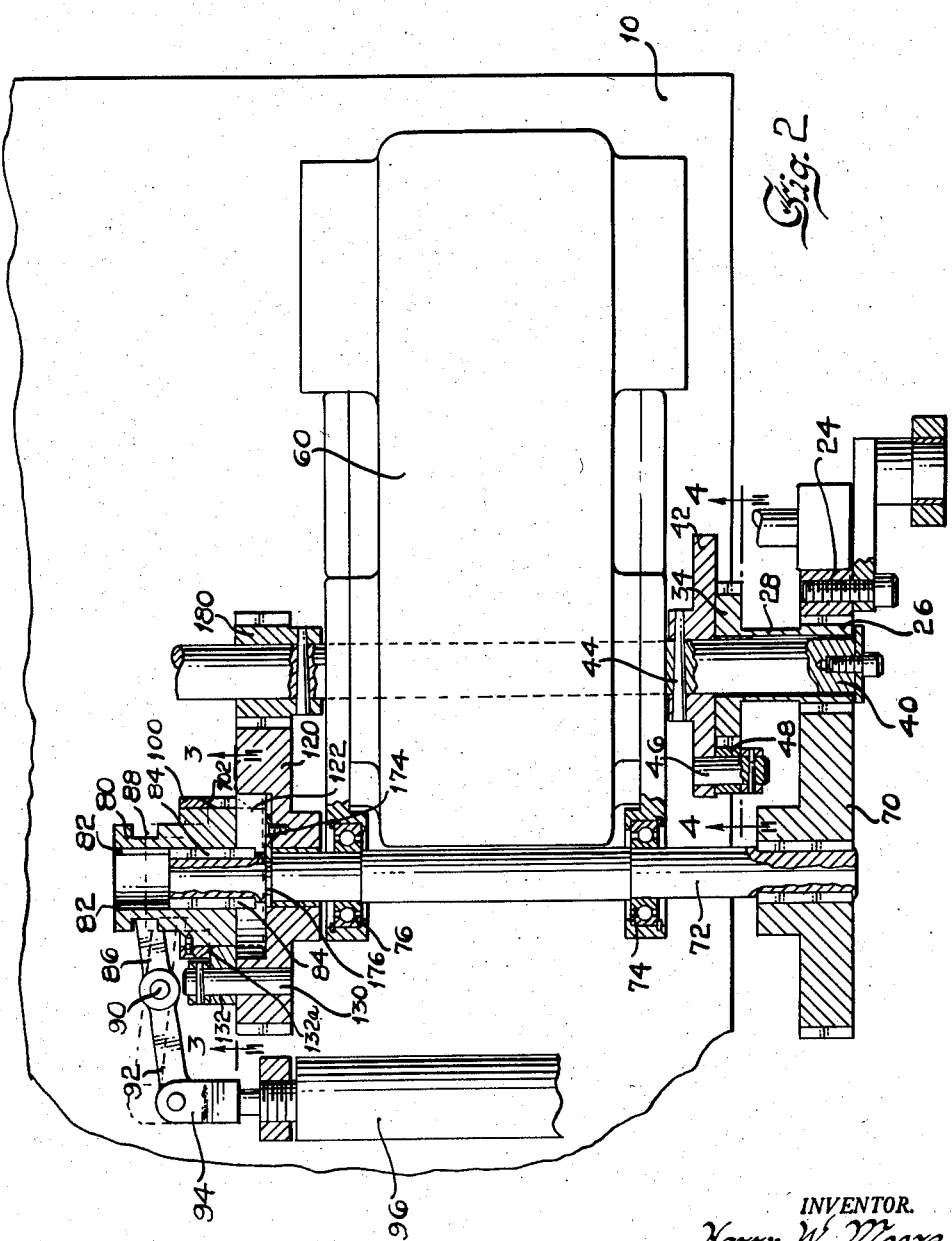

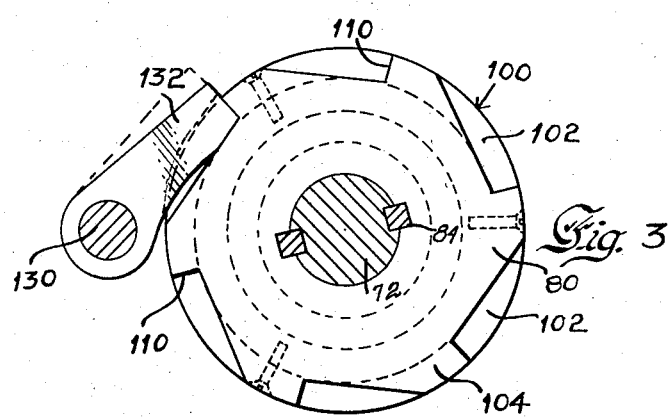
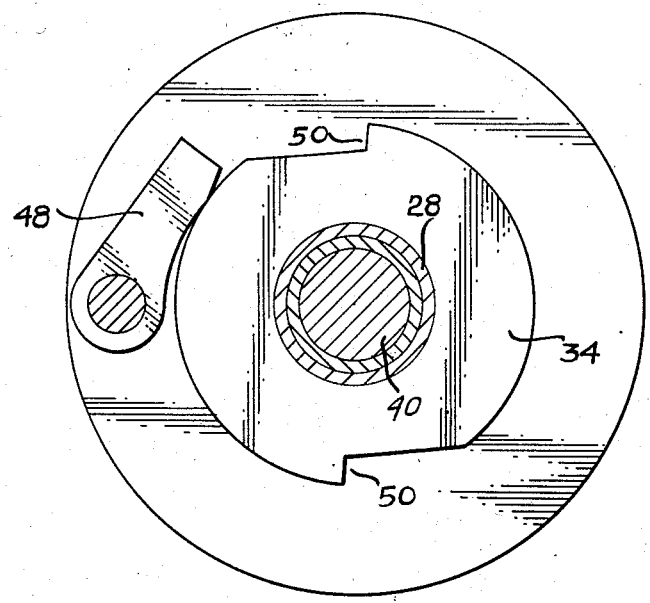

United States Patent Office 2,893,250
Patented July 7, 1959

2,893,250

ROTARY TO OSCILLATING DRIVE

Harry W. Moore, Dayton, Ohio

Application January 7, 1955, Serial No. 480,547

5 Claims. (Cl. 74—29)

This invention relates to a driving mechanism utilizing a rack having a reciprocatory movement provided with teeth meshing with a pinion mounted for rotary movement, and more particularly to a driving mechanism for a coil winding mechanism wherein the coil winding mechanism is driven through one driving mechanism when the rack travels in one direction and through another driving mechanism when the rack travels in the other direction, although not necessarily so limited, as will become more apparent from the description that follows.

This application discloses an improvement upon the Coil Winding Machine disclosed in the John M. Biddison application Serial No. 353,160, filed May 5, 1953, now abandoned.

An object of this invention is to provide a driving mechanism including a toothed rack having a reciprocatory movement and meshing with a pinion, so as to drive the pinion in one direction when the rack travels in one direction and in the opposite direction when the rack travels in the opposite direction, the pinion being connected to two separate driving mechanisms, one driving the load when the rack travels in one direction and the other driving the load when the rack travels in the opposite direction.

Another object of this invention is to provide a driving mechanism utilizing a toothed rack and a pinion for actuating a coil winding machine, the rack and pinion causing the coil winding machine to wind a predetermined number of turns in a coil when the rack travels in one direction and some other number of turns in a coil when the rack travels in the opposite direction.

Another object of this invention is to provide a driving mechanism for a coil winding machine driven from a toothed rack having a reciprocatory movement, the teeth of the rack meshing with the teeth of the pinion so as to drive the pinion in opposite directions during each cycle of the rack, the pinion in turn driving a pair of driving mechanisms so arranged that one of said last mentioned driving mechanisms drives the coil winding machine when the rack travels in one direction and the other driving mechanism drives the coil winding machine when the rack travels in the opposite direction, the two driving mechanisms being so arranged that the coils are wound in the same or opposite directions, either with the same number of turns or one coil having a greater number of turns than the other coil.

Another object of this invention is to provide a device wherein a pair of pawls are used, one for each of the driving mechanisms referred to above, and wherein a pawl ejecting mechanism is used for ejecting one of the pawls into an inoperative position during the inoperative period of that particular driving mechanism, to prevent locking of the two driving mechanisms.

The foregoing objects may be accomplished by providing a rack driving a pitman from an eccentirc driven by a gear reducing mechanism of an electric motor, the rack being provided with teeth meshing with a pinion driving a pair of pawls, each pawl being associated with a ratchet wheel member mounted for rotary movement, each of the pawls being connected to a load, at least one of which may be connected through a train of gears so as to cause one pawl to drive its load when the rack travels in one direction and the other pawl driving its load when the rack travels in the opposite direction, at least one of the pawls being associated with a change speed mechanism so that the load driven by one of the pawls travels faster than the load driven by the other pawl, as will appear more fully from the description that follows.

Other objects and advantages reside in the construction of parts, the combination thereof and the mode of operation, as will become more apparent from the following description.

Referring to the drawings, Figure 1 is a side elevational view of the driving mechanism illustrated for use in connection with a coil winding machine similar to the coil winding machine disclosed in the John M. Biddison application Serial No. 353,160, filed May 5, 1953.

Figure 2 is a cross sectional view of the gear mechanism taken substantially on the line 2—2 of Figure 1.

Figure 3 is a cross sectional view, taken substantially on the line 3—3 of Figure 2, disclosing the pawl driven by the ratchet wheel member.

Figure 4 is another fragmentary, cross-sectional view, taken substantially on the line 4—4 of Figure 2, disclosing another pawl associated with its ratchet mechanism.

Figure 5 is a schematic view of the gear mechanism used in one of the driving devices.

In the drawings, the reference numeral 10 indicates a base of a coil winding machine that supports an electric motor 12, provided with a speed reducing gear box 14, having mounted on the drive shaft a crank arm 16 supporting a crank pin 18, driving a pitman 20, pivotally mounted on a bracket 22 attached to a toothed rack 24 mounted for reciprocatory movement. Guide blocks 25 and 27 and guide rollers 30 and 32 cooperate in guiding the toothed rack 24. The toothed rack 24 meshes with a pinion 26 integral with a tubular sleeve 28, terminating in a ratchet wheel 34. The sleeve 28 is journalled upon a shaft 40 having keyed thereto a disc 42 by a transverse key 44. The disc 42 is provided with a pin 46 supporting a pawl 48 adapted to engage one of the ratchet notches 50 in the ratchet wheel or disc 34. The shaft 40 is connected with a chain of gears mounted in the housing 60 for driving a coil winding mechanism that has not been shown in this application. This coil winding mechanism is more fully described in the above referred to Biddison application Serial No. 353,160.

It may be readily seen that when the rack 24 advances upwardly from the position shown in Figure 1, that the tubular sleeve 28 will rotate the disc 34, so as to cause one of the notches 50 to move into engagement with the pawl 48, thereby driving the shaft 40 in a counterclockwise direction, as viewed in Figure 4, to drive the chain of gears in the housing 60 used in driving the fliers or winding mechanism disclosed in the aforementioned Biddison application Serial No. 353,160. It may be readily seen that when the rack 24 is retracted from the "up" position downwardly into the "down" position, the notch 50 will move away from the pawl 48, whereby the pawl 48 will remain inactive and will not drive the shaft 40.

When the rack 24 advances from the "up" position to the "down" position, the shaft 40 is then driven by another driving mechanism, which will now be described. The pinion 26 meshes with a gear 70 keyed to a shaft 72 journalled in bearings 74 and 76. The shaft 72 non-rotatably supports a member 80 that is mounted for longitudinal adjustment upon the shaft 72. Member 80 is provided with a pair of key ways 82 having mounted therein a pair of keys 84, fixedly attached near one end of the shaft 72. A yoke 86, having pins seated in an annular groove 88 in member 80, is pivotally mounted upon a fixed pivot 90. An arm 92 of the yoke 86 is connected to a piston rod 94 driven by a fluid actuated piston 96. Member 80 has mounted thereon a ring 100 having a bevelled surface 102. This ring 100 is mounted in a groove upon the periphery of an enlarged portion 104 of member 80. This enlarged portion 104 has a width greater than the ring 100. The portion of the enlarged portion 104 extending beyond the ring 100 is provided with a plurality of ratchet notches 110, so as to form a ratchet wheel.

The shaft 72 is provided with a gear 120 that is mounted between the bearing 76 and member 80. The gear 120 is provided with a hollow, cylindrical recess 122, provided with a key 174 seated in a slot 176 in the shaft 72. The key 174 permits rotary movement of the gear 120; but prevents axial movement on the shaft. This gear 120 is provided with a pin 130 supporting a pawl 132 adapted to engage one of the notches 110 when the yoke 86 holds member 80 in the full line position shown in Figure 2.

When the rack 24 moves from the "up" position into the "down" position, the pinion 26 drives the gear 70, so as to rotate the shaft 72 in a clockwise direction, as viewed in Figure 3, causing one of the notches 110 to engage the pawl 132, thereby driving the gear 120 meshing with a pinion 180 keyed to the shaft 40 to drive the shaft 40, thereby driving the chain of gears in the housing 60. The rate of rotation of the shaft 40, when driven by the pawl 48, need not necessarily be the same as the rate of rotation of the shaft 40 when it is driven by the pawl 132. For example, in the drawing, the pawl 48 may drive the shaft 40 through four revolutions when the rack moves upwardly. When the rack moves downwardly, the shaft 40 may then be only rotated through three revolutions. By this arrangement, it is possible to obtain a speed ratio of the shaft as 4 is to 3 for each complete cycle of the rack 24. When the pawl 48 drives the shaft 40, the gear or pinion 180 will then drive the gear 120 in the reverse direction from the direction of rotation of the gear 120 when it is driven by the pawl 132. However, due to the fact that the shaft 40 travels at a higher rate of speed when it is driven by the pawl 48 than when it is driven by the pawl 132, it is necessary to remove the pawl 132 from engagement with the notches 110 whenever the shaft 40 is driven by the pawl 48.

When the yoke is actuated from the full line position into the dotted position, member 80 has the enlarged portion thereof seated so as to fill the recess 122, thereby causing the bevelled surface or cam 102 of the ring 100 to engage a bevelled margin 132a of the pawl 132, to thereby raise the pawl 132 out of engagement with the notches 110. In other words, the pawl 132 is then raised into the dotted position shown in Figure 3. This has been accomplished by energizing the cylinder containing the piston 96, so as to actuate the yoke 86 from the full line position into the dotted position and thereby cause ring 100 to eject the pawl 132 from engagement with all of the notches 110.

A suitable timing mechanism that may be controlled by the movement of the rack 24 is used to control the movement of the piston rod 94, so as to eject the pawl 132 at the proper time and so as to permit the pawl to drop into the notches when it is time for the pawl 132 to do the driving. For the purpose of illustration, a pair of microswitches 190, actuated by a pin 192 mounted on the side of the rack, is used to control the operation of the piston rod 94.

It can readily be seen that the shaft 40 rotates in one direction when it is driven by the pawl 48 and in the opposite direction when driven by the pawl 132. The shaft 40 may be driven in the same direction both when the ratchet 24 moves upwardly and when it moves downwardly by inserting the pinion 200 either between the pinion 26 and the gear 70 or inserting a pinion between the gear 120 and the pinion 180, as is clearly illustrated in the schematic view shown in Figure 5.

This type of drive lends itself ideally for use with a coil winding machine, in that whenever the pitman 20 passes through dead center, no movement is imparted to the mechanism driven thereby. In other words, the coil winding mechanism momentarily stands still. This permits the form upon which the coils are wound to be indexed, as more fully described in the above referred to Biddison application Serial No. 353,160. By providing two pawls, it is possible to wind coils such that when the pawl 48 drives the coil winding machine, a predetermined number of layers are wound into the coil and when the pawl 132 actuates the coil winding machine, another number of layers are wound into the coil. For example, in winding an armature it may be desirable to have three windings in one coil and four in another, or four windings in one coil and five in another, depending upon the design of the particular armature. The coil winding machine disclosed herein is capable of automatically winding the coils having a different number of layers. The coils wound in response to the movement caused by one of the pawls may be wound in the same direction as the coils wound in response to the movement of the other pawl, or the coils may be wound in opposite directions.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A driving mechanism for use in a coil winding machine, the combination including a motor, a speed reducing mechanism driven by said motor, said speed reducing mechanism having an outlet crank, a pitman driven by said crank, a rack mounted for reciprocatory movement, means for connecting the pitman to the rack, a pinion driven by the rack, driving means driven by said pinion, said driving means including a pawl member for driving a load only when the rack travels in one direction, a second driving means including a second pawl member for driving a load only when the rack travels in the opposite direction, said second driving means including a pair of gears having a gear ratio such that the load is driven at a speed different from that of the speed of the load driven by the first driving means so that the number of turns formed while rotating in one direction differs from the number of turns when rotating in the opposite direction, and means for ejecting the pawl member of the slower driving means when the coil winding machine is driven by the faster driving means.

2. A driving mechanism according to claim 1, wherein the means for removing the pawl member of the slower driving means includes a cam and fluid actuated means for actuating the cam.

3. A driving mechanism according to claim 1, wherein means are provided for reversing one driving means with respect to the other driving means so that the two driving means drive the load in the same direction.

4. A driving mechanism for use with a rack meshing with a pinion, said rack being driven to and fro for rotatably driving a load, said driving mechanism including a pair of pawl members, a pair of means driven by the pinion for actuating the pawl members, a pair of driving means, one of said driving means being driven in only one direction by one of the pawl members only when the rack travels in one direction, the other driving means being driven in only one direction by the other pawl member when the rack travels in the opposite direction, said pair of driving means having different speed ratios whereby one pawl member travels faster than the other pawl member, and means for removing the slower moving pawl member from engagement by its driving means when the rack moves in the direction in which the faster pawl member is engaged by its driving means.

5. A coil winding machine for winding an armature having a plurality of slots, the combination including a motor, a speed reducing mechanism driven by said motor, said speed reducing mechanism having an outlet crank, rack means mounted for reciprocatory movement, means for connecting the crank to the rack means so that it is driven by said outlet crank, a pinion driven by the rack means, driving means including a pawl driven by said pinion, said driving means including a mechanism for driving a load only when the rack means travels in one direction, and a second driving mechanism including a second pawl for driving the load only when the rack means travels in the opposite direction, said second pawl having an operative position and an inoperative position, and means responsive to the travel of the rack means at the end of its stroke in one direction for moving the second pawl into inoperative position.

References Cited in the file of this patent

UNITED STATES PATENTS

| | | |
|---|---|---|
| 657,943 | Kimball | Sept. 18, 1900 |
| 1,190,764 | Hazen | July 11, 1916 |
| 1,860,703 | Christian | May 31, 1932 |
| 2,245,352 | Moessinger | June 10, 1941 |